United States Patent [19]

Kristensen

[11] Patent Number: 5,628,246
[45] Date of Patent: May 13, 1997

[54] EGG PROCESSING MACHINE

[75] Inventor: Jens K. S. Kristensen, Odense, Denmark

[73] Assignee: Sanovo Engineering A/S, Odense NV, Denmark

[21] Appl. No.: 609,387

[22] Filed: Mar. 1, 1996

[51] Int. Cl.$^6$ .................. A23J 1/00; A23J 1/09; A47J 43/14; A01K 43/00

[52] U.S. Cl. ............................. 99/500; 99/497

[58] Field of Search ............... 99/495–500, 568, 99/581, 582, 577, 578, 472; 426/478–480, 490, 614

[56] References Cited

U.S. PATENT DOCUMENTS

| | | | |
|---|---|---|---|
| 2,815,055 | 12/1957 | Willsey | 99/499 X |
| 2,818,096 | 12/1957 | Willsey | 99/499 |
| 3,185,194 | 5/1965 | Ellis et al. | 99/499 |
| 4,321,864 | 3/1982 | Willsey | 99/500 |
| 4,773,322 | 9/1988 | Willsey | 99/499 |
| 4,895,069 | 1/1990 | Kristensen | 99/582 |
| 4,919,042 | 4/1990 | Rasmussen | 99/499 |
| 5,085,139 | 2/1992 | Pellegrinelli | 99/500 |
| 5,112,181 | 5/1992 | Rasmussen | 414/416 |
| 5,293,815 | 3/1994 | Tomosue | 99/498 |
| 5,410,953 | 5/1995 | Yamashita | 99/500 |
| 5,460,083 | 10/1995 | Hutchinson et al. | 99/484 |

*Primary Examiner*—Timothy F. Simone
*Attorney, Agent, or Firm*—Sughrue, Mion, Zinn, Macpeak & Seas

[57] ABSTRACT

An egg processing machine comprises egg breaking units positioned above egg collecting units and an albumen recovery device. The units are moved in pairs with a vertical distance between the two units through an egg breaking section where the egg breaking unit breaks the egg shell and albumen and yolk fall down in the egg collecting unit. An albumen recovery device comprises a rotating body catching albumen drippings with possible stringers before the egg shell is discharged.

22 Claims, 4 Drawing Sheets

EGG PROCESSING MACHINE

BACKGROUND OF THE INVENTION

The present invention relates to an egg processing machine comprising egg breaking units and egg collecting units moving along at least one endless travel path and an albumen recovery device.

Such an egg processing machine is known from U.S. Pat. No. 4,773,322. The albumen recovery device includes a vacuum system drawing air in through an inlet opening in a pickup head, which in an active position is held stationary aligned with the travel path of the egg breaking and egg collecting units. The inlet opening in the pickup head faces upwards and draws albumen remains out of the broken egg shell when the egg breaking unit passes above the inlet opening.

When one egg breaking unit passes the pickup head stringers and albumen remains from one egg shell may land on the external side of the pickup head and stick momentarily thereto without being drawn into the inlet opening. When the following egg collecting unit passes below the pickup head such stringers and albumen may get in contact with or drip down onto the egg collecting unit. It is a disadvantage that the contents of one egg in this manner can get in contact with the collecting unit holding the contents of another egg.

After breaking the egg and separating the albumen and the yolk the quality of the egg material in the egg collecting unit may be controlled in order to discharge or isolate egg contents of inferior quality. A satisfactory quality of the resulting egg materials may require an isolation of the contents of each individual egg until its quality has been controlled.

SUMMARY OF THE INVENTION

It is an object of the present invention to prevent stringers, albumen and other remains from an egg handled by one pair of egg breaking and egg collecting units from getting into contact with subsequent pairs of egg breaking and egg collecting units.

It is another object of the invention to recover a larger part of the egg materials that previously.

It is a further object of the invention to minimize the power consumption required to recover albumen and other egg materials.

Further objects of the invention will be seen from the following detailed description of embodiments according to the invention.

In order to achieve these and other objects an egg processing machine may comprise egg breaking units moving along at least one endless upper travel path, and egg collecting units moving along at least one endless lower travel path which along at least part of its length is positioned below said upper travel path, and an albumen recovery device, the egg breaking units being synchronized with the egg collecting units so that the units are moved in pairs with a vertical distance between the two units through an egg breaking section where the egg breaking unit breaks the egg shell and albumen and yolk fall down in the egg collecting unit, wherein the egg breaking section is followed by a recovering section in which the vertical distance between the egg breaking units and the egg collecting units is increased, and the albumen recovery device is positioned in said recovering section and comprises a body rotating about a body axis extending transversely past said upper and said lower travel paths, said rotating body catching albumen drippings with possible stringers before the egg shell is discharged during the continued movement of the egg breaking unit away from the associated egg collecting unit.

The invention will be best understood by reference to the following description of preferred embodiments of an egg processing machine according to the invention which is illustrated in the accompanying schematic drawings wherein the same elements are identified in the several views by the same reference numerals.

DETAILED DESCRIPTION OF PREFERRED EMBODIMENTS

An egg processing machine generally designated 1 includes several egg breaking units 2 moving along an endless upper travel path indicated by the dot-and-dash line 3, and egg collecting units 4 moving along an endless lower travel path indicated by the dot-and-dash line 6.

Figure 1:
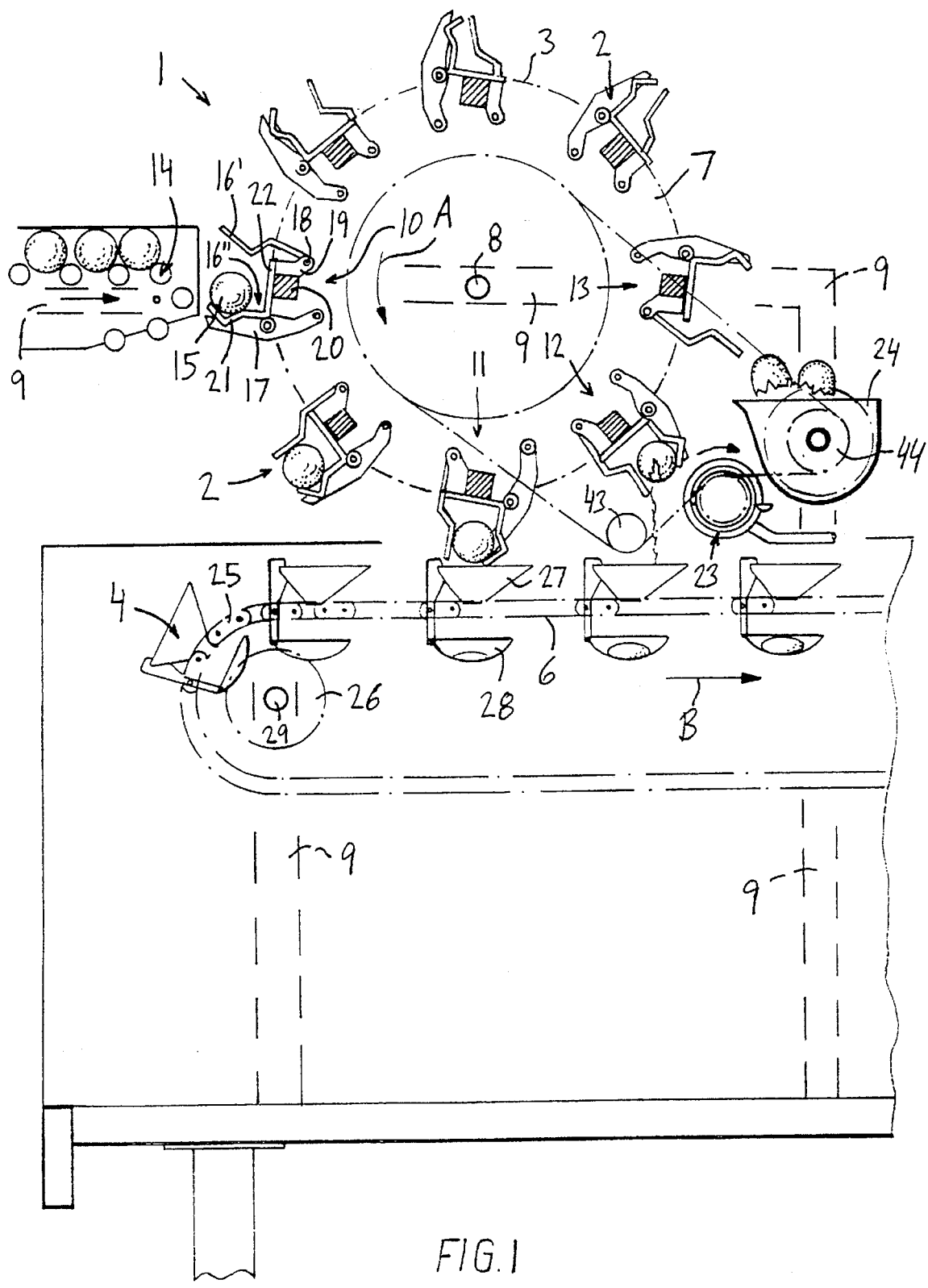
FIG. 1 shows a side elevation of an egg processing machine having an albumen recovery device embodying features of the invention, with certain elements omitted and others shown in part.

In the example shown in FIG. 1 the upper travel path 3 is circular because the egg breaking units are mounted on a wheel 7 fixed on a central shaft 8 which is journalled in a rigid supporting machine frame 9 which is shown in part for reasons of clarity of the drawing. A motor drive, not shown, is connected to the shaft and rotates wheel 7 in direction of arrow A with a settable speed driving the egg breaking units in a common movement with a travelling speed along the circular upper travel path.

During one revolution about shaft 8 the egg breaking units travel through at least an egg loading section 10, an egg breaking section 11, an egg recovery section 12 and an egg shell discharging section 13.

In the egg loading section 10 an egg supplying conveyor 14 delivers one egg 15 to each passing egg breaking unit 2 which by pairs of gripping and holding plates 16', 16" grip and hold the egg shell on opposite sides of the egg and on both sides of a knife 17. On one side of the egg the gripping and holding plate 16' is mounted pivotable about a pin 18 on a bracket 19 which is fixed on a square rod 20 extending from wheel 7 in parallel with shaft 8. On the other side of the egg the gripping and holding plates 16" include two angle-shaped parts each having one leg 21 projecting outwards to support the egg and another leg 22 extending obliquely from leg 21 to a pivot mounted on the end of bracket 19 so that the two angle-shaped parts are articulated and can swing the two legs 21 apart in order to open a broken egg shell. The knife 17 includes two blades journalled to a respective leg 21 so that the blades participate in the swinging movements of the associated leg 21 and act as stops for the edges of the broken egg shell.

In the egg breaking section 11 the knife 17 breaks the egg shell, and legs 21 are pivoted to open the egg, and the egg materials fall out and down into the associated egg collecting unit 4 positioned below the egg breaking unit.

During the continued movement of the broken and opened egg through the egg recovery section 12 the egg breaking unit passes an albumen recovery device 23 which catches and collects egg material, such as stringers, albumen and broken off shell parts hanging down or dripping out from the egg shell, as will be described in further detail in the following.

In the egg shell discharging section 13 the egg gripping and holding plate 16' is pivoted away from legs 21 releasing the grip on the egg shell which slides down into a shell collecting means or a shell receiving means 24. The shell receiving means 24 may comprise a chute or a conveyor disposing of the egg shells by transporting or conveying the egg shells to a larger receptacle positioned outside the area of the above mentioned travel paths.

The egg collecting units 4 are mounted on a conveyor, such as a chain 25, mounted on a pair of horizontally spaced sprockets 26 (only the left hand sprocket is shown, but the right hand sprocket has an identical design). The collecting units 4 are mounted on the conveyor with an even spacing along its entire length, but for reasons of simplicity only some of the units 4 have been shown in FIG. 1. Each egg collecting unit includes a separating cup or yolk retainer 27 and an albumen receiving cup 28 positioned below the yolk retainer when the unit 4 is in the area of the egg breaking section 11.

Sprocket 26 is mounted on a shaft 29 which is journalled in the supporting machine frame 9. A motor drive, not shown, is connected to the shaft and rotates shaft 29 with sprocket 26 with a settable speed driving the upper run of the conveyor with the egg collecting units 4 in a common movement in direction of arrow B with a travelling speed which is equal to the travelling speed of the egg breaking units 2. The spacing of the egg breaking units 2 in the upper travel path is equal to the spacing of the egg collecting units 4 in the lower path, and the movements of the units in respective upper and lower paths are synchronized or timed so that each downwards moving egg breaking unit 2 meets an egg collecting unit 4, and these two units are moved through the egg breaking section 11 as a pair of units separated by a varying vertical distance. When the egg is broken the vertical distance between the pair of units is short and the egg content is released into the egg collecting unit in a controlled manner.

The upper travel path may be designed with alternative shapes. For instance, the egg breaking units 2 may be mounted to an upper conveyor having an elongate shape corresponding to the lower conveyor carrying units 4. In this case, the upper conveyer may include an endless chain mounted on a pair of horizontally spaced sprockets, which entails the advantage that the travelling zone or section 11 where the egg is broken and the pair of units 2, 4 are separated by a favourably short vertical distance is considerably extended in the travelling direction. After opening of the egg, the pair of units consequently take a considerably longer time to travel through the egg breaking section 11 so that the egg content sticking to the shell after the initial emptying af the contents down into the egg collection unit is allowed longer time to drip out of the shell. The result is a higher utilization of the pure content of each single egg, because less egg material will have to be grabbed by the albumen recovery device 23, in which albumen of different eggs may get mixed.

In one embodiment the machine is designed with several upper travel paths 3 and several lower travel paths 6 positioned side by side with a suitable path spacing in the transverse direction corresponding to the longitudinal axis of shaft 29. Egg processing machines of this kind is well known in the art and is, inter alia, described in detail in the U.S. Pat. Nos. 2,524,844, 3,190,328 and 5,185,194, which are hereby incorporated in the present disclosure by reference.

Figure 3:
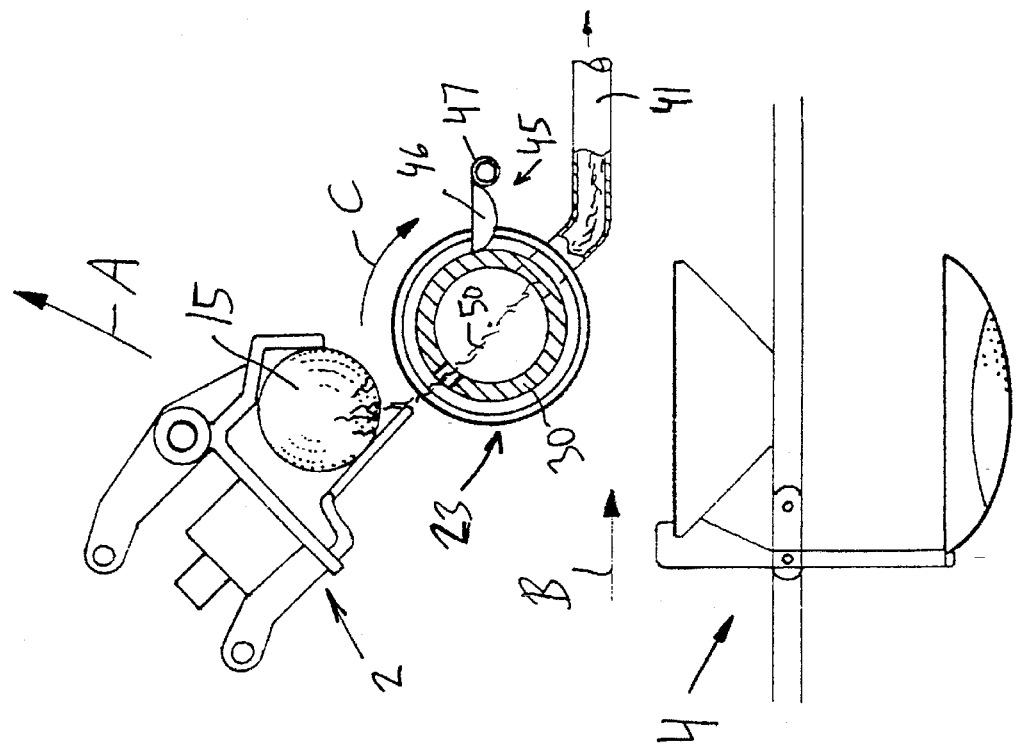
FIG. 2 and 3 are fragmental, partly cross-sectional views to a larger scale showing the albumen recovery device in two active positions recovering egg material from a broken egg shell.

A preferred embodiment of the albumen recovery device 23 is now described with reference to FIGS. 2–4. When the pair of units 2, 4 is advanced into the egg recovery section 12 shown on a larger scale in FIGS. 2 and 3, the vertical distance between the two units is increased in order to provide space for the device 23, so that the egg breaking unit 2 passes above and the egg collecting unit 4 passes below device 23.

The device 23 includes a body 30 rotating about an axis 31 extending transversely to the travelling paths of the units. The rotating body is a hollow cylinder having an outer or external diameter D, which e.g. may be in the range from 50 mm to 120 mm. Now referring to FIG. 4, one end of the cylinder carries a shaft extension 32 with a square hole inserted over a mating driving shaft member 33 having a shaft end of square cross-section. The shaft member 33 is pivotally mounted in two bearing members 34, 35 fixed to machine frame 9. A sprocket 36 is fixed to shaft member 33 and is connected with a drive through a chain 37. The other end of the cylinder is pivotally supported inside a sliding bearing 38 which is fixed in a pipe-shaped housing 39 fixed to a bracket 40 being mounted to machine frame 9. The sliding bearing has a radially inwards protruding collar acting as an end stop for axial movements of the rotating cylinder. When sprocket 9 rotates, the cylinder participates in the rotational movement and slides with respect to the stationary housing 39.

Via a suction pipe 41 the interior of housing 39 is connected with a vacuum pump in a vacuum system, which may be of the type described in U.S. Pat. No. 4,773,322 hereby included in the present disclosure by reference. The cylinder end positioned in bearing 38 is open ended and the interior space in the hollow cylinder is in free communication with the interior of housing 39. The hollow cylinder is provided with a longitudinally extending array of suction holes 42 which each is extending through the cylinder wall and is positioned in alignment with its pertaining upper travel path 3 so that the hole is positioned approximately adjacent the centre of the passing broken egg shell held by the egg breaking unit travelling in said pertaining upper travel path. The number of suction holes in said row may correspond to the number of upper travel paths positioned side-by-side. If the machine has only a single upper travel path, the hollow cylinder may include only a single suction hole 42 and may have a correspondingly shorter length.

In the depicted embodiment hole 42 is circular, but it will be understood that other shapes, such as slot like, elongate or square-shaped holes are also well suited. It is further possible to design the cylinder with a single or a few slots extending across the number of travelling paths. On one hand this design requires no precise axial positioning of the rotating cylinder relative the travelling paths, but on the other hand the required size and power consumption of the vacuum pump will be larger due to the larger suction area.

The rotational speed of the rotating body 30 is adapted to its external diameter D and the travelling speed and mutual spacing of the egg breaking units 2 so that the suction hole faces towards the egg breaking unit being at a shortest distance from the rotating body every time the egg breaking units have been advanced through a distance corresponding to said mutual spacing. In other words, each unit 2 is met by a suction hole positioned towards the unit. If the circumference of the rotating body corresponds to the spacing between units 2 the pheriferal velocity of the rotating body may be equal to, the double or the tripple, etc. of the travelling speed of said units 2. It is further possible to design the rotating body with two diametrically oppositely positioned suction holes for each upper travel path, and in that case the pheriferal velocity can be half of the velocity used with the embodiment with one suction hole per path, as each hole may meet every second passing unit 2. The body 30 rotates in direction of arrow C, viz. upwards on the side facing the upper travel path 3.

Figure 4:
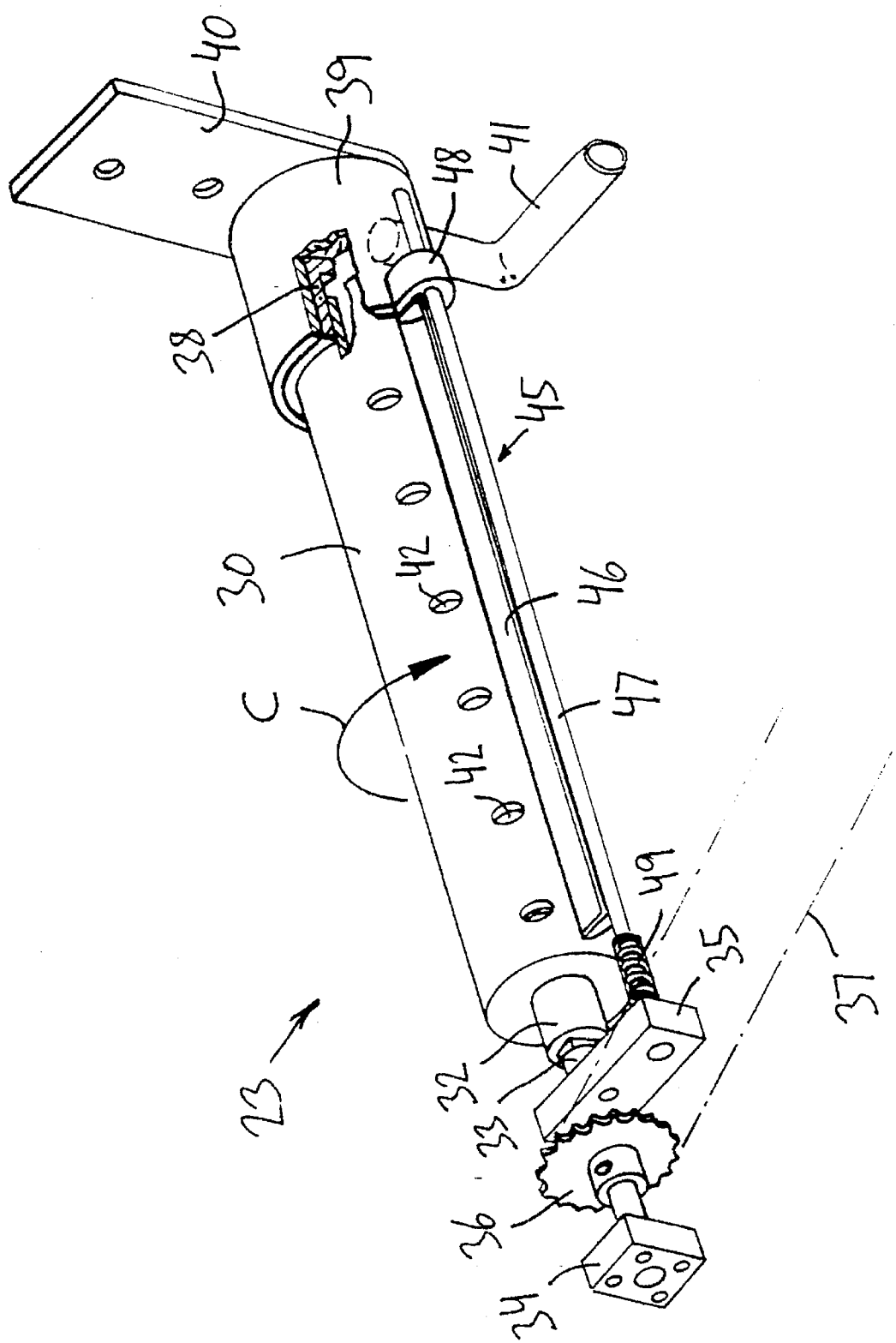
FIG. 4 is a perspective view of the albumen recovery device in FIG. 1, on a larger scale.

The rotating body may be driven by an independant motor drive acting on the chain indicated in FIG. 4. However, it is preferred that the chain 37 is driven directly synchronized with wheel 7 in the manner indicated in FIG. 1 where the chain runs over a sprocket on shaft 8 and is guided by chain sprockets 43 and 44 pivotally mounted to the machine frame and the shell receiving device 23.

On the side facing away from the incoming egg breaking units 2 the albumen recovery device 23 includes a scraper means 45 comprising a channel-shaped member 46 fixed, e.g. by welding to a rod 47 which in one end is inserted through a supporting bore in a boss 48 fixed to housing 39. The opposite end of rod 47 is pivotally supported in bearing member 35. A torsion spring 49 acts on the rod with a torque urging the longitudinal inner edge of the channel-shaped member 46 to abut on the external side of rotating body 30 so that egg material clinging to said body is scraped of the body and received in member 46. The end of member 46 may be connected to a drain or to the suction pipe 41, or the egg material received in the member 46 may simply be allowed to be drawn into the suction holes as they pass member 46.

Figure 2:
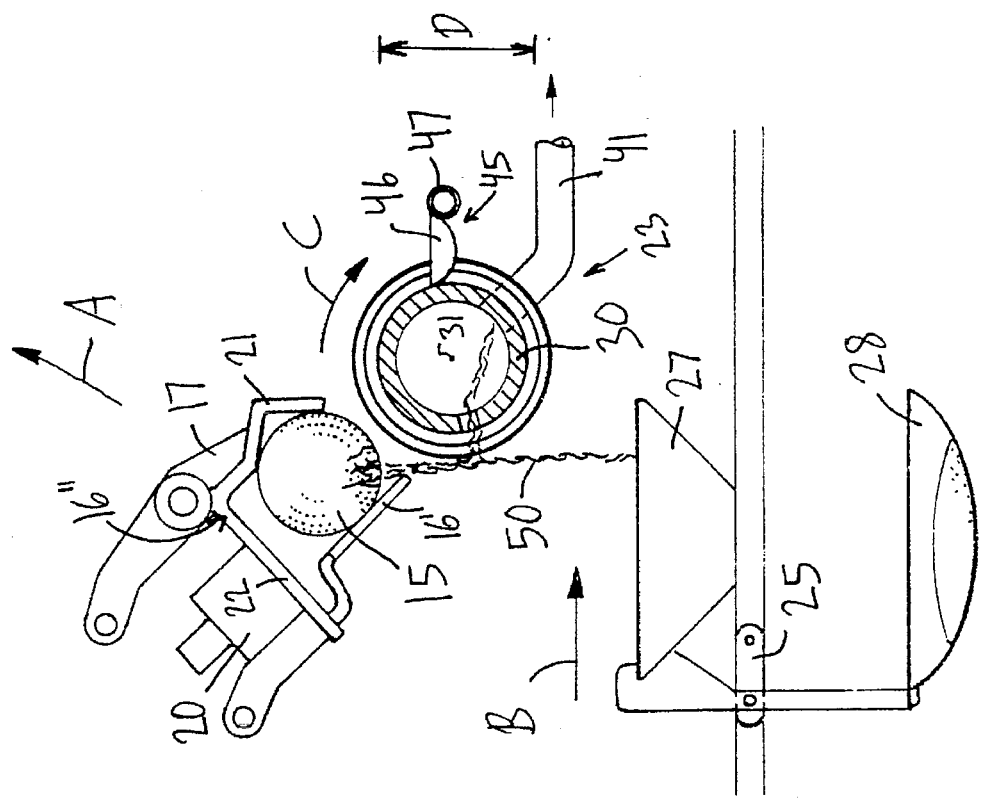

When the egg breaking unit 2 approaches the albumen recovery device 23, egg material 50, such as albumen and a stringer may be hanging down from or dripping out of the egg shell as indicated in FIG. 2. This egg material is partly gripped by contact with the external side of the rotating body and scraped of by scraper means 45, partly drawn into the suction hole 42 by the air flowing into the interior of the body due to the vacuum therein. The movement of the rotating body may be timed to the advancing egg breaking unit in the manner shown in FIGS. 2 and 3 where the hole 42 is facing mainly horizontally (FIG. 2) at the initial contact with the stringer etc, and is facing directly into or towards the broken egg shell when this is closest to the rotating body (FIG. 3). In this manner egg remains are efficiently gripped with the main portion being drawn into the rotating body and furthermore the egg shell is efficiently cleaned for remaining egg material. If any material should drip down from the shell after passing the position in FIG. 3, the drippings will land on top of the rotating body and be transferred to the scraping means.

In the following only differences to the embodiments mentioned above are described.

Figure 5:
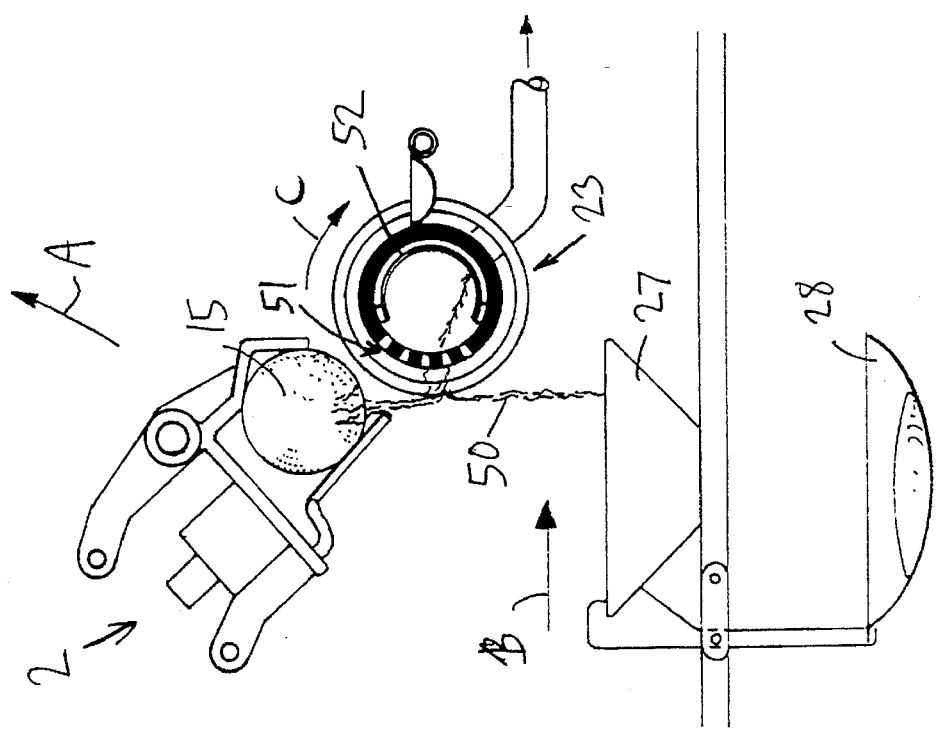
FIG. 5 is a cross-sectional view corresponding to FIG. 2, of a second embodiment of the albumen recovery device in the invention.

In the further embodiment shown in FIG. 5 the hollow cylinder has a row of suction holes 51 for each upper travel path. Each row of suction holes is arranged in a circumferential direction of the cylinder, and the rotation of the body is timed to the movement of the egg breaking units 2 so that the row of suction holes is facing possible egg remains 50 when the egg breaking units are moved into and through the recovering section. The circumferential row of holes act on downhanging egg material over a larger area which may cause a more quick recovery of the material, but on the other hand a more powerful vacuum pump is required in order to maintain the vacuum. This disadvantage may be reduced by providing the hollow cylinder with a stationary shield 52 which on a side facing away from approaching eggs blocks the suction holes. The shield may preferably be positioned in the interior space of the cylinder where it can be fixed to the housing 39 without interfering with the scraper means.

Figure 6:
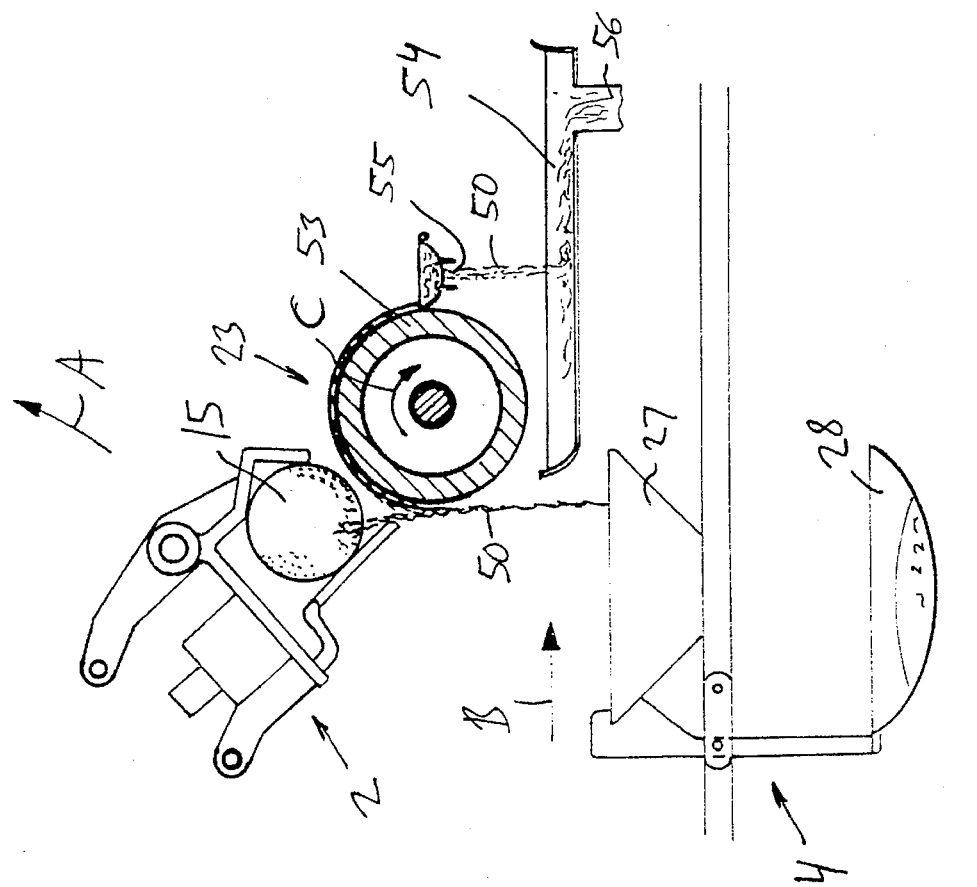
FIG. 6 is a cross-sectional view corresponding to FIG. 2, of a third embodiment of the albumen recovery device in the invention.

In the embodiment shown in FIG. 6 the albumen recovery device includes a cylinder 53 without suction holes. The cylinder grips on its external surface the egg materials which are transferred to the scraper means in the same manner as above described. This embodiment is not sensitive to timing or synchronization of the rotation of cylinder 53 to the travelling speed of the egg breaking units 2. However, it is preferred that a drive rotates the cylinder body with a pheriferal velocity being different from the travelling speed of the egg breaking units 2, as this will cause the cylinder 53 to effect a pull in a stringer hanging out from the egg shell. The cylinder 53 may have the slowest velocity of the two, but more preferably the pheriferal velocity of the cylinder is at least the double of said travelling speed.

From FIG. 1 appears that the rotating body is positioned in between the lower path 6 and the upper path 3 at a lower level than the egg shell receiving device 24. It may be an advantage to all the above mentioned embodiments to mount a drip collecting tray 54 (shown in FIG. 6) below the rotating body and the egg shell receiving device in an area above said lower path so that the egg collecting units 4 pass under the tray. The tray can collect recovered egg material from the scraper means by simply dumping the scraped-off material through a discharge opening 55. From the tray the material runs via a discharge pipe 56 to a storage.

In one embodiment the upper travel path and the lower travel path are combined to a common path, and in the area of the albumen recovery device the vertical distance between the paired egg breaking units and egg collecting units is increased.

What is claimed is:

1. An egg processing machine comprising egg breaking units moving along at least one endless upper travel path, and egg collecting units moving along at least one endless lower travel path which along at least part of its length is positioned below said upper travel path, and an albumen recovery device, the egg breaking units being synchronized with the egg collecting units so that the units are moved in pairs with a vertical distance between the two units through an egg breaking section where the egg breaking unit breaks the egg shell and albumen and yolk fall down in the egg collecting unit, wherein the egg breaking section is followed by a recovering section in which the vertical distance between the egg breaking units and the egg collecting units is increased, and the albumen recovery device is positioned in said recovering section and comprises a body rotating about a body axis extending transversely past said upper and said lower travel paths, said rotating body catching albumen drippings with possible stringers before the egg shell is discharged during the continued movement of the egg breaking unit away from the associated egg collecting unit.

2. An egg processing machine as claimed in claim 1, wherein the rotating body is circular cylindrical and the albumen recovery device includes a scraper means scraping recovered materials, such as albumen, shell remains and stringers, of the pheriferal surface of the rotating body.

3. An egg processing machine as claimed in claim 1, wherein the egg breaking units are moved with a travelling speed along said upper travel path, and a drive rotates the body with a pheriferal velocity being different from the travelling speed of the egg breaking units.

4. An egg processing machine as claimed in claim 3, wherein said pheriferal velocity is at least the double of said travelling speed.

5. An egg processing machine as claimed in claim 3, wherein the rotating body is positioned in between the lower path and the upper path at a lower level than an egg shell receiving device for discharged egg shells, and wherein a drip collecting tray extends below the rotating body and the egg shell receiving device in an area above said lower path.

6. An egg processing machine as claimed in claim 3, wherein the machine comprises several upper travel paths and several lower travel paths positioned side by side, and the rotating body extends transversely past all said travel paths.

7. An egg processing machine as claimed in claim 1, wherein the egg breaking units in each upper path are mounted with a mutual spacing, and the rotating body is a hollow cylinder having an outer diameter, an interior space and a cylinder wall and being provided with at least one suction hole extending through the cylinder wall, said interior space being connected to a vacuum pump drawing air in through the suction hole, and wherein the body is rotated synchronized with the travelling speed of the egg breaking units in the upper path so that a suction hole faces towards the egg breaking unit being at a shortest distance from the rotating body every time the egg breaking units have been advanced through a distance corresponding to said mutual spacing.

8. An egg processing machine as claimed in claim 7, wherein the outer diameter of the rotating body is adapted to said spacing so that a point on the circumference of the body rotates during one revolution of the body through a distance equal to the spacing.

9. An egg processing machine as claimed in claim 8, wherein the body is rotated with a pheriferal velocity being mainly equal to the travelling speed of the egg breaking units.

10. An egg processing machine as claimed in claim 8, wherein the rotating body includes a single suction hole for each upper travel path, and the rotation of the body is timed to the movement of the egg breaking units so that the suction hole faces directly towards the egg breaking unit when the broken egg shell held by the unit is at a shortest distance from the body.

11. An egg processing machine as claimed in claim 7, wherein the machine comprises several upper travel paths and several lower travel paths positioned side by side, and the rotating body extends transversely to said travel paths and includes at least one suction hole per upper travel path.

12. An egg processing machine as claimed in claim 11, wherein the rotating body is circular cylindrical and the albumen recovery device includes a scraper means scraping recovered materials, such as albumen, shell remains and stringers, of the pheriferal surface of the rotating body.

13. An egg processing machine as claimed in claim 12, wherein the rotating body has an external diameter in the range from 50 mm to 120 mm.

14. An egg processing machine as claimed in claim 13, wherein the rotating body is positioned in between the the lower path and the upper path at a lower level than an egg shell receiving device for discharged egg shells, and wherein a drip collecting tray extends below the rotating body and the egg shell receiving device in an area above said lower path.

15. An egg processing machine as claimed in claim 7, wherein the hollow cylinder has a row of suction holes for each upper travel path, said row of suction holes being arranged in a circumferential direction of the cylinder, and wherein the rotation of the body is timed to the movement of the egg breaking units so that the row of suction holes is facing possible egg remains, such as albumen and stringers, hanging down from the broken egg shell when the egg breaking units are moved through the recovering section.

16. An egg processing machine as claimed in claim 15, wherein the hollow cylinder is provided with a stationary shield which on a side facing away from the upper and lower travel paths blocks the suction holes.

17. An egg processing machine as claimed in claim 16, wherein the stationary shield is positioned in the interior space of the cylinder, and the albumen recovery device includes a scraper means scraping recovered materials, such as albumen, shell remains and stringers, of the pheriferal surface of the rotating body.

18. An egg processing machine as claimed in claim 17, wherein the rotating body is rotational cylindrical with an external diameter in the range from 50 mm to 120 mm.

19. An egg processing machine as claimed in claim 18, wherein the rotating body is positioned in between the the lower path and the upper path at a lower level than an egg shell receiving device for discharged egg shells, and wherein a drip collecting tray extends below the rotating body and the egg shell receiving device in an area above said path.

20. An egg processing machine as claimed in claim 19, wherein the machine comprises several upper travel paths and several lower travel paths positioned side by side, and the rotating body extends transversely to said travel paths and includes one row of suction holes per upper travel path.

21. An egg processing machine as claimed in claim 7, wherein the hollow cylinder has at least two suction holes for each upper travel path, said two suction holes being arranged at diametrically opposite positions on the cylinder, and wherein the rotation of the body is timed to the movement of the egg breaking units so that one of the suction holes is facing possible egg remains, such as albumen and stringers, hanging down from the broken egg shell when the egg breaking units are moved through the recovering section.

22. An egg processing machine comprising egg breaking units and egg collecting units moving along at least one endless travel path, and an albumen recovery device, the egg breaking units and the egg collecting units being moved in pairs with a vertical distance between the two units through an egg breaking section where the egg breaking unit breaks the egg shell and albumen and yolk fall down in the egg collecting unit, said egg breaking section being followed by a recovering section in which the vertical distance between the egg breaking units and the egg collecting units is increased, wherein the albumen recovery device is positioned in said recovering section and comprises a body rotating about a body axis extending transversely past said at least one travel path, said rotating body catching albumen drippings with possible stringers before the egg shell is discharged during the continued movement of the egg breaking unit away from the albumen recovery device, wherein the rotating body is circular cylindrical and the albumen recovery device includes a scraper means scraping recovered materials, such as albumen, shell remains and stringers, of the pheriferal surface of the rotating body, and wherein the rotating body has an external diameter in the range from 50 mm to 120 mm.

* * * * *